June 24, 1958 — A. D. LUND — 2,840,120
STORAGE BATTERY GRID PASTING MACHINE
Filed Aug. 4, 1954 — 5 Sheets-Sheet 1

INVENTOR.
ARTHUR D. LUND
BY
Carlsen & Hazle
ATTORNEYS

June 24, 1958  A. D. LUND  2,840,120
STORAGE BATTERY GRID PASTING MACHINE
Filed Aug. 4, 1954  5 Sheets-Sheet 2

INVENTOR.
ARTHUR D. LUND
BY
ATTORNEYS

INVENTOR.
ARTHUR D. LUND
BY
Carlsen & Hagle
ATTORNEYS

June 24, 1958   A. D. LUND   2,840,120
STORAGE BATTERY GRID PASTING MACHINE
Filed Aug. 4, 1954   5 Sheets-Sheet 4

FIG.7

INVENTOR.
ARTHUR D. LUND
BY
Carlsen + Hoyle
ATTORNEYS

United States Patent Office 2,840,120
Patented June 24, 1958

2,840,120

STORAGE BATTERY GRID PASTING MACHINE

Arthur D. Lund, Minneapolis, Minn., assignor, by mesne assignments, to The Electric Storage Battery Company, Philadelphia, Pa., a corporation of New Jersey Application August 4, 1955, Serial No. 526,359

15 Claims. (Cl. 141—32)

This invention relates to improvements in machines for automatically applying the pasty, active material to storage battery grids.

The primary object of my invention is to provide in a machine of this general character an improved paste feeding and applying organization of components which will function effectively to apply an accurately controlled amount of paste to the grids and to fill the interstices in the grids with paste to a thickness controlled by troweling bars or elements between which the grids are passed after they leave the pasting zone.

Another object of my invention is to provide a machine of this kind which is relatively simple and inexpensive, conveniently adjustable to accommodate grids of standard sizes and capable of being readily cleaned as necessary after long periods of operation.

Still another object of my invention is to provide an extremely simple means for accumulating excess paste which may fall from the pasting zone as the operation of the machine proceeds and for periodically returning such paste to the hopper in which it is kept in the machine.

Another object of the invention is to provide guide bars between which the battery grids pass through the pasting zone and to provide such bars with portions designed to block or blank out border areas of the grids in order that the paste will be applied only to the reticulated central areas of the grids. In furtherance of this object I also provide for the convenient removal and replacement of such guide bars with others having blanking out portions of different dimensions so as to accommodate the machine to operation on grids of varying sizes.

Still another object is to provide in a machine of this character, and as component parts of the actual paste applying elements, a cooperating paste feed roller and shoe along with means whereby the two may be adjusted together in such fashion as to determine the amount of paste supplied to the pasting zone or, to put it another way, to regulate the thickness of the film or ribbon of paste which is delivered to and pressed into the grids. In addition I also provide means for conveniently, independently adjusting this paste feed roller not only to properly position it with reference to other components of the machine but also to compensate for wear as the machine is used over long periods of time.

The present invention is an improvement over the grid pasting machine shown in my prior Patent No. 2,375,424, issued May 8, 1945, to which particular attention is invited for comparative purposes.

These and other more detailed and specific objects will be disclosed in the course of the following specification, reference being had to the accompanying drawings, in which—

Fig. 10 is a fragmentary enlarged frontal elevation of the adjacent portions of two of the guide bars showing the manner in which they meet at the pasting zone of the machine. The plane at which Fig. 9 is taken is indicated by the line 9—9 in this view.

As stated, the purpose of this invention is to provide a machine for applying the pasty, active material to storage battery grids and at the outset it might be noted that such grids are each made up of a casting of generally rectangular shape having a border which surrounds a reticulated network of wires and ribs into the spaces between which the paste is to be pressed and by which network the paste will be held in place once it is applied. These parts are referred to as grids in the industry and at the stage of manufacture during which the paste is applied the grids are in pairs, with each pair making up whas is commonly referred to as a grid panel. The grids are provided with lugs by which electrical connections are made in the finished battery and while in the panel stage these lugs project in opposite directions from the opposite ends of the panels, making it convenient to move the panels about while they are supported by their lugs between conveyor chains, as well as to transfer panels by means of notched carrier disks as is well known in the art. Once the pasting has been completed the individual grids are separated and they are thereafter referred to in the industry as battery plates, but in the interests of accuracy the terms "grids" and "grid panels" will be used in the course of the following specification.

Figure 1:
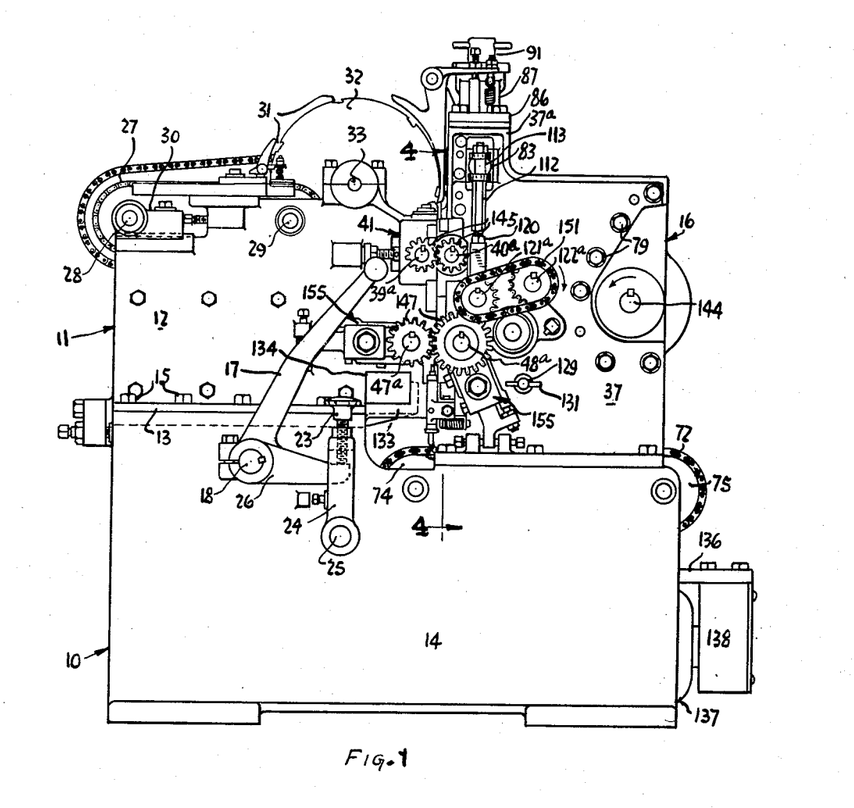
Fig. 1 is a side elevation of a grid pasting machine according to my present invention, viewing the same from what may be regarded as its right-hand side, as determined by the position of an operator standing at the forward end of the macine at which the grids to be pasted are received
Figure 2:
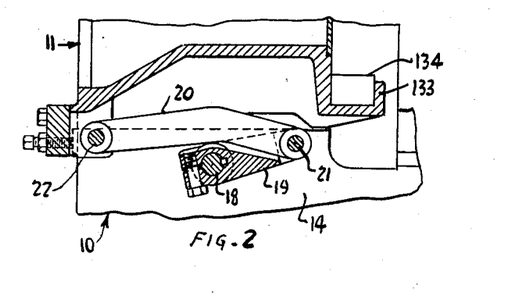
Fig. 2 is an enlarged fragmentary vertical and longitudinal section through the forepart of the machine showing the linkage by means of which the grid feed unit is adjusted toward and away from the paste feed unit.

Referring then with more particularity and by reference characters to the drawing, my improved pasting machine comprises a suitable base designated generally at 10, upon the forward portion of which there is slidably mounted a grid panel feed unit, indicated generally at 11. This unit 11 is arranged for forward and rearward sliding motion atop the base 10 for which purpose the sides 12 of the unit are provided with flanges along their lower edges and guide bars 13 overlie these flanges to hold them upon the upper edges of the corresponding sides 14 of the base, the said guides themselves being held in place by cap screws indicated at 15. Secured to the rear portion of the base 10 is a paste feed unit, indicated generally at 16, and the purpose of thus slidably mounting the grid panel feed unit 11 is to permit it to be moved toward or away from the unit 16, for which purpose there is provided a hand lever 17 keyed to a cross shaft 18 suitably journaled to the upper forward portion of the sides 14 of the base. As seen in Fig. 2 the shaft 18 between the sides 14 of the base carries a pair of links 19 and 20 pivotally connected at 21, with the longer link 20 extending forwardly and pivotally connected at 22 to the lower forepart of unit 11. In the normal or work position of the two units 11 and 16 they are located in immediate juxtaposition as shown throughout the drawing and in such condition the links 19 and 20 are jackknifed, as seen in Fig. 2. When it is desired to move the unit 11 forwardly, clear of unit 16, as may be necessary for cleaning purposes or to replace and adjust the parts, it is only necessary to grasp the hand lever 16 and swing the same forwardly, whereupon the links 19—20 will be extended in order to project unit 11 in the proper direction. Such movement of the hand lever 17 is, however, ordinarily prevented by means of an adjustable stop screw 23 carried by an arm 24 swingable upon a stud 25 on the right-hand side of the base 10, as best seen in Fig. 1. The hand lever 17 has a forwardly extending lever arm 26 underlying the stop screw 23 and while the machine is in operation the stop screw 23 is turned down to hold the two units 11—16 in proper working relationship, but when it is desired to move unit 11 forwardly the screw is merely loosened and the arm 24 swung rearwardly far enough to clear so that the hand lever 16 may be swung forwardly as just described.

Figure 11:
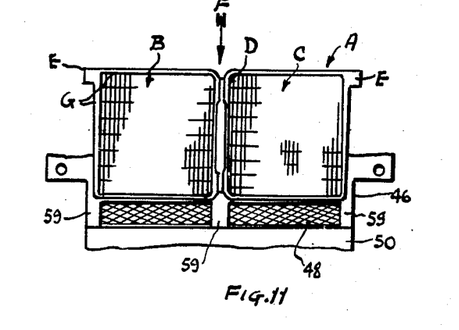
Fig. 11 is a fragmentary frontal elevation to the same scale as Fig. 4 of the lower central portion of the parts as shown in that view, but showing also the grid panel as it approaches a pasting zone.

Aside from certain components forming part of the paste applying mechanism per se, the grid panel feed unit 11 is little changed by comparison with that shown in my prior patent hereinbefore identified, but in any event it will be noted that a grid panel conveying mechanism is provided in the upper portion of the unit 11, made up of transversely spaced conveyor chains 27 operating over suitable sprockets mounted upon front and rear sprocket carrying stub shafts or shafts 28 and 29. The rear stub shafts 29 are journaled in the sides 12 of the unit 11 while the forward shaft 28 is rotatably carried in an adjustable bearing 30 so that the sprocket chains 27 may be maintained in a proper taut condition. At this point reference is made to Fig. 11 in which one of the grid panels is designated generally at A and it will be seen that each panel is made up of two grids B and C which are cast as a unit and joined together at the center D of the panel by a narrow strip of scrap which is subsequently trimmed off in order to separate the individual grids. It will further be noted that each of the grids B and C has a terminal lug, designated at E, and in the panel stage these lugs E project from the opposite ends of the panel so that the panels may be conveyed between the aforesaid chains 27 merely by hanging the panels with the lugs E in engagement with said chains. The conveyor chains 27 operate in such fashion that the panels hung between them will be moved in a rearward direction in the machine here disclosed and the lugs E on successive panels are engaged by notches 31 formed in the peripheral edges of transfer or carrier disks 32 rotatably mounted upon a shaft 33 carried by the upper rear portion of unit 11. The rotation of the disks 32 is clockwise as viewed in Fig. 1, with the result that as each grid panel A reaches the disks 32 its lugs E will be engaged by one of the notches 31 so that the panel will then be carried upwardly, rearwardly and then downwardly by the rotation of the disks. The purpose is to deliver the panels A edgewise one at a time into an upwardly flaring receiving throat, indicated at 34 in Fig. 7, formed as will be described by cooperating elements on the adjacent vertical surfaces of the units 11—16 so that the panels may move in a vertical direction downwardly between the units, the direction being indicated by the arrow F in Fig. 11. Further details of the construction of the grid panel feed unit 11 will appear in the course of the following description.

Referring again to Fig. 11 and in order to complete the description of the panels A, it will be seen that each of the grids B and C comprises an imperforate, generally rectangular border G surrounding a center network or reticulated area into which the pasty, active material is to be pressed and held. Such areas are made up of intersecting wires and ribs in a manner well known in the art so that no further explanation should be required herein, but it is to be understood that the grids B and C while in the panel have what is actually their lower edges joined by the scrap center portion D, inasmuch as the terminal lugs E will project upwardly in the finished battery. In some batteries the height of the grids is greater than in others and it will therefore be obvious that the over-all dimension of the panels, as measured horizontally in Fig. 11, will vary. There will, of course, ordinarily be a corresponding variation in the size of the center network areas of the grids into which the paste is to be pressed and as will be presently set forth I make provision in my machine for the accurate filling of these network areas of the panels, without any undesired overlapping of paste onto the borders, or equally undesired failure to completely fill up the center areas of the panels, by an extremely simple replacement of one component of the paste applying mechanism per se.

Figure 7:
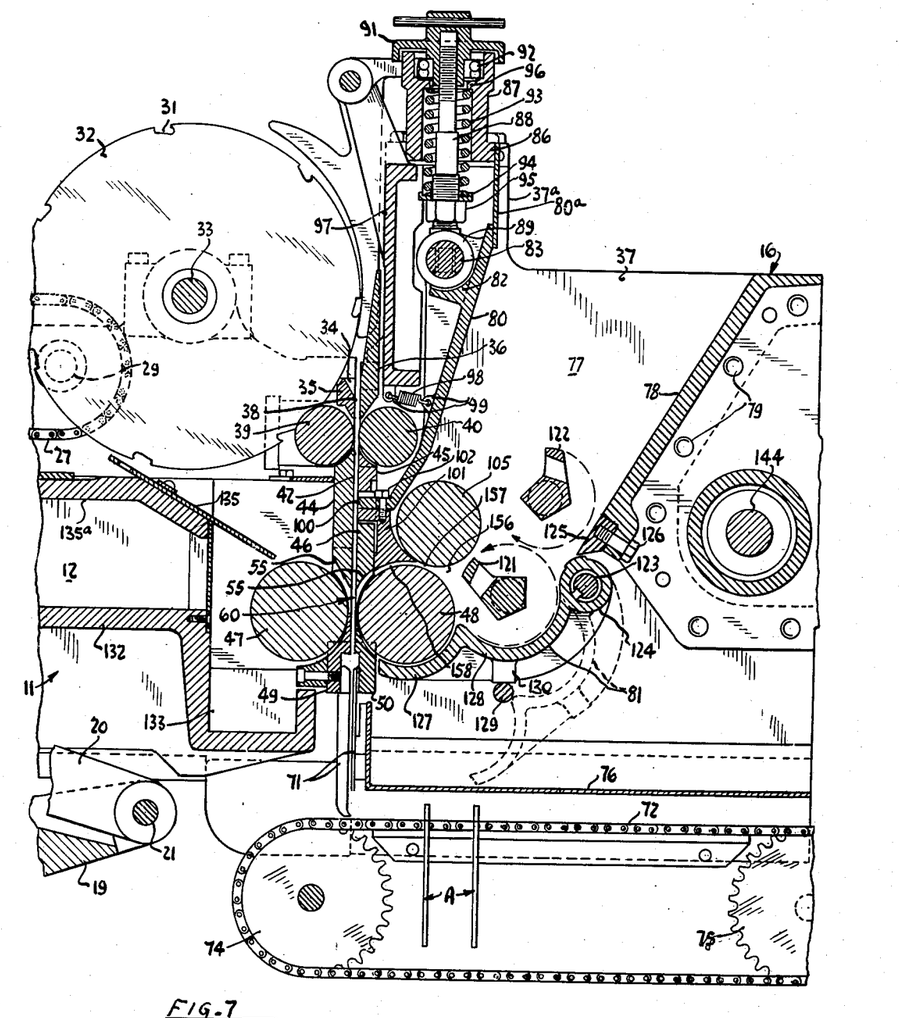
Fig. 7 is a vertical and longitudinal sectional view along the line 7—7 in Fig. 4 and showing only the central portion of the machine, both the front and rear ends thereof being broken away.
Figure 9:
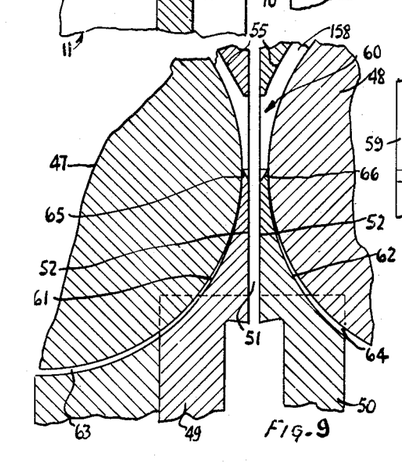
Fig. 9 is a still further enlarged vertical and longitudinal sectional view of adjacent portions of the two paste applying rollers and of the troweling bars by which the paste is applied to the grids.
Figure 10:
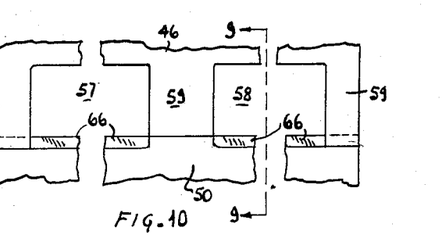

As stated just above the panels A as they come off the carrier disks 32 move edgewise downwardly into the throat 34 and said throat is formed by spaced apart front and rear throat forming bars 35 and 36, both of which have their contiguous faces beveled to provide the upward flare for the throat as aforesaid. In common with other somewhat similarly arranged bars shortly to be described the bars 35 and 36 are respectively secured across the adjacent rear and forward ends of the units 11—16, respectively, and the sides 12 and 37 of said units are suitably flanged so that these bars may be held in place by screws or other appropriate means. The space 38, as designated in Fig. 8, between the bars 35 and 36 nicely accommodates the thickness of the grid panels A so that the latter may slide freely downward in frictional contact with the bars and as the panels leave the throat they are engaged by opposed, oppositely rotating panel feed rollers 39 and 40, the peripheral surfaces of which are knurled in order to frictionally engage and move the panels in the downward direction. The rollers 39—40 are journaled between the sides 12 and 37 of the units 11—16 respectively and, of course, suitable provision is made for adjusting their spacing so that they will properly engage the panels, as for example note the readily understandable and completely conventional adjustable bearing mounting designated at 41 in Fig. 1. After passing between the rollers 39—40 the panels move downwardly through the space 42 between a front guide bar 44 secured to the sides 12 of unit 11 and vertically spaced apart upper and lower rear guide bars 45 and 46 likewise secured to the sides 37 of unit 16. The panels then pass between opposed paste applying rollers 47—48 oppositely rotating in the direction of the arrows of Fig. 8 and then in turn the panels pass between troweling bars 49—50 secured to the sides 12 and 37 respectively of units 11—16. It is to be understood that the distance between the contiguous surfaces of the bars 35—36, 44, 45, 46 and 49—50 is such that the panels may pass freely downward through the passageway thus formed and that the distance between the adjacent peripheral surfaces of the rollers 47 and 48 is greater than the width or thickness of this passageway as here shown so that these rollers do not themselves engage the panels, although they mutually cooperate in applying the paste to the panels. It is the space 51 between the adjacent vertical troweling surfaces of the troweling bars 49—50 which determines the thickness of the paste applied to the panels and these surfaces, designated at 52, also operate upon the paste as applied to the panels by the rollers 47 and 48 with a troweling or ironing effect to compact and smooth the paste into the network areas of the panels. The lower edges of the guide bars 44—46 and upper edges of the troweling bars 49—50 accurately meet in close fitting relationship in a horizontal plane coinciding with a line drawn between the axes of rotation of the rollers 47—48, and it will be noted in Fig. 8 that the opposite, forward and rearward lower portions of the guide bars 44—46 are arcuately beveled at 53 and 54 respectively in order to just clear the peripheral surfaces of the rollers 47 and 48, said surfaces being knurled as are those of the rollers 39—40 as is indicatd in Fig. 4. However, it is only narrow opposite end and central portions of the guide bars 44—46 that are thus arcuately beveled and between these portions the guide bars are still further cut away angularly, as designated at 55, to a greater degree and to a greater height, as is best seen in Figs. 7 and 9. In effect openings, indicated at 57 and 58 in the face view of Fig. 10, are thus formed between the downward and less severely beveled extensions 59 at the ends and center of these guide bars and said openings constitute what may be regarded and is hereinafter referred to as a pasting zone, designated at 60 in Fig. 9. In a similar fashion the front and rear upper portions of the troweling bars 49 and 50 are arcuately beveled at 61 and 62 respectively, but the curvature of these bevels is such that only the upper edges of the beveled surfaces engage the peripheral surfaces of the rollers 47—48 from which point downward and in opposite directions there are spaces of gradually increasing thickness indicated at 63 and 64. Also to be noted (and best shown in Fig. 9) the upper edges of the troweling bars 49—50 are oppositely beveled at 65—66 forming an upwardly flaring throat for paste applied in the pasting zone 60 to the panels, below which bevels the aforesaid surfaces 52 of the troweling bars then compact and trowel the paste into place.

Figure 8:
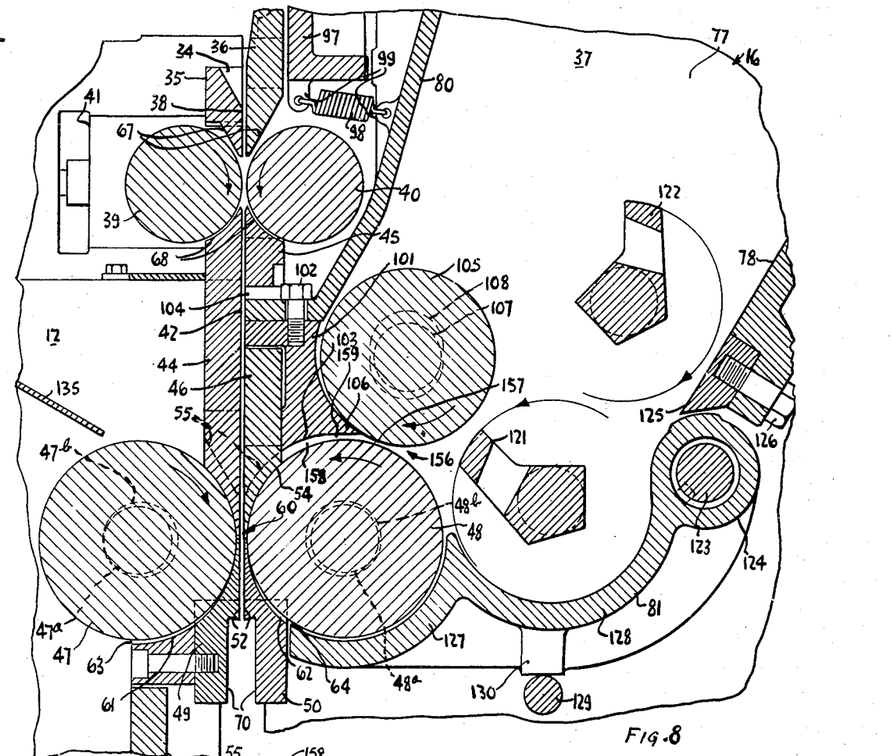
Fig. 8 is a still further enlarged vertical and longitudinal sectional view of those components appearing in the central area of Fig. 7, the view being taken substantially along the line 8—8 in Fig. 4.

It will be noted, as best shown in Fig. 8 that the throat forming bars 35—36 and guide bars 44—45 are beveled at lower and upper edges 67 and 68 respectively so that the grid panel feed rollers 39—40 may fit closely enough together to frictionally engage and feed the grid panels A in the downward direction.

As the pasted panels fall from the troweling bars 49—50, which as seen have clearance notches 70 (Fig. 8) in their lower facing edges, the fall of the plates is decelerated by the travel of the plates downward between friction members 71 and the panels finally drop between carry-away conveyor chains 72—73, supported by their lugs resting on the chains as aforesaid. These chains 72—73 are operated by suitable sprockets 74—75 and their upper spans travel in a rearward direction to deliver the pasted plates out the rear of the machine from beneath the paste feeding unit 16. It will also be seen in Fig. 7 that a removable pan 76 is arranged as a bottom for the unit 16 to prevent any paste from falling from said unit down upon the conveyor chains.

The unit 16 includes a paste hopper or receptacle 77 in which a supply of the pasty active material to be applied to the grid panels is kept. This hopper is formed by the sides 37 of the unit 16 and by a rear wall forming plate 78 which is bolted in place between the sides as seen at 79, by a forward adjustable hopper wall 80 and by a bottom 81. The forward wall 80 is, as stated, adjustable and the movement is in an upward and downward direction for a purpose presently to appear. For this purpose the upper portion of the wall is provided with a bearing 82 surrounding a cross shaft 83 extending outwardly to the sides 37 of unit 16 and through openings 84 in said sides which are so dimensioned as to permit upward and downward movements of said shaft. The side walls 37 have upward projections 37a at this point which are outwardly flanged, as designated at 85 in Fig. 4, so that a cross head 86 may be firmly secured thereto. Centrally this cross head 86 is provided with a vertically bored extension 87 in which there is located an adjustment screw 88, the lower end of which is tapped into a cylindrical journal 89 mounted upon shaft 83 in the notch 90 provided for its reception in the aforesaid bearing 82. An adjustment knob 91 is also threaded upon the upper end of the screw 88 and is provided with a detent mechanism 92 (Fig. 7) of any suitable form which permits it to be turned but holds it in any adjusted position against accidental displacement. A heavy expansion coil spring 93 is coiled around the screw 88 and braced between a washer 94 held by a nut 95 threaded on the lower end of the screw and an inwardly projecting annular shoulder 96 (Fig. 7) formed within the bore of said extension 87. The arrangement is thus obviously such that the spring 93 will tend to bias the forward wall 80 of the hopper 77 in a downward direction, the extent of which movement is limited by the adjustment of the aforesaid knob 91, while the spring will also permit the wall to move upward should a jam occur in the paste supplying components, as will also presently appear. The upper edge of the hopper forward wall 80 slidably engages a guide plate 80a to guide the wall in such movement, this plate being secured to crosshead 86 as in Fig. 7. The foreparts of the sides 37 of the unit 16 are joined by a heavy cross beam 97 for stiffening purposes and a retractile coil spring 98 is stretched between lugs 99 on this beam 97 and the lower forward portion of the wall 80 in order to swing the lower end of said wall in a forward direction. At its lower extremity the wall 80 is provided with a forwardly projecting foot flange 100 to which is secured the upper, forwardly flanged end of a shoe or scraper element 101, the two parts being adjustably held together by cap screws 102. The shoe 101 has a contact rib 103 (Fig. 8) which bears against the rear surface of guide bar 46 to limit the aforesaid forward swinging motion of the wall 80 under influence of the spring 98 and as clearly shown the guide bars 45 and 46 are spaced apart vertically in order to provide a recess 104 between them for the loose reception of the flanged portions of the wall 80 and shoe 101, this recess being of such vertical dimension as to permit the aforesaid upward and downward movements of the wall 80.

Figure 4:
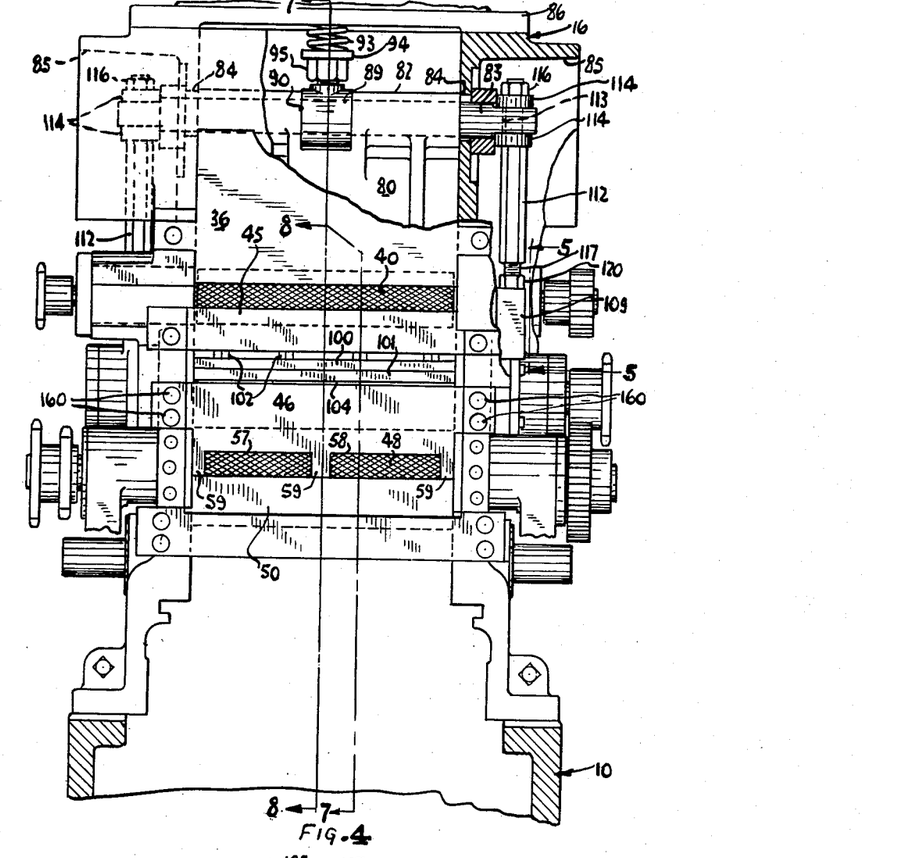
Fig. 4 is an enlarged front face view of the paste applying unit with portions of the base and the upper part of said unit broken away and shown in section, this view being taken substantially along the line 4—4 in Fig. 1.
Figure 5:
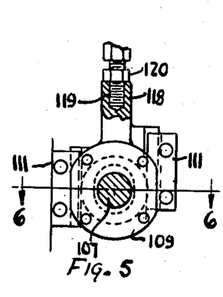
Fig. 5 is an enlarged sectional detail view taken substantially along the line 5—5 in Fig. 4 to illustrate the adjustable mounting for the paste feed roller and the bearing therefor.
Figure 6:
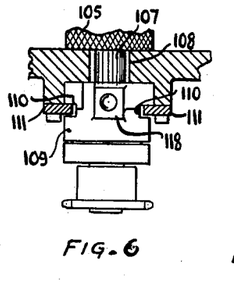
Fig. 6 is a fragmentary horizontal sectional view taken substantially along the line 6—6 in Fig. 5.

Further forming part of the paste applying mechanism is a paste feed roller 105 located just above and slightly rearwardly with respect to the roller 48 and the shoe 101 has a rearwardly projecting sharp toe or scraper edge 106 which rests in scraping relation with the underside of the roller 105 just forward of the point at which the rollers 48—105 are closest together. This paste feed roller 105 has laterally projecting trunnions or stub shafts 107 extending outwardly through openings 108 which clear the trunnions 107, permitting both upward and downward, as well as forward and rearward, movements thereof with respect to said sides 37 as will be obvious in Fig. 8. As is best shown in Figs. 4, 5 and 6 the trunnions 107 at each end of the roller 105 are journaled outwardly through bearings 109 which are vertically notched on front and rear sides at 110 for slidable engagement with gibs 111 secured to the outer surfaces of the sides 37. These bearings 109 are below the upwardly projecting ends of the aforesaid cross shaft 83 and the extremities of said shaft are flattened as well as vertically bored to receive the rods or bars 112 of hexagonal or other rectilineal cross section. The upper ends of these tie rods 112 are turned around and reduced to extend diametrically through end opening notches 113 formed in the extremities of the cross shaft 83 and the tie rods are held against relative vertical displacement with respect to said shaft by means of collars 114 and nuts 116 screwed upon the upper ends of the studs. Some distance above the bearings 109 the lower ends of the tie rods 112 are reduced, rounded and threaded as seen at 117 and these ends are screwed down into upward projections 118 of the bearings which are provided with tapped sockets 119, as seen in Fig. 5. Lock nuts 120 are also screwed upon the ends 117 and are turned down tight upon the upper ends of the projections 118. It will be obvious from the aforesaid that the rods 112, by tying the bearings 109 to the extremities of the cross shaft 83, will cause the forward paste hopper wall 80 and the paste feed roller 105 to move upwardly and downwardly as a unit so that the scraping relationship of the toe 106 with the roller 105 will be maintained under all conditions of adjustment of the hopper wall. However, the roller 105 may be adjusted independently of the wall 80, and its associated shoe 101, merely by loosening the nuts 120 and applying a wrench to the hexagonal portions of the tie rods 112 and then resetting the lock nuts. This independent adjustment is vital not only to properly level the paste feed roller 105 or, to put it another way, to precisely align its axis in parallelism with the axis of the roller 48 but also to compensate for wear which may occur during the operation of the machine and maintain the scraping relationship of the toe 106 with the roller. While not shown in the drawings it is to be understood that the peripheral surface of this paste feed roller 105 is knurled, as are also the corresponding surfaces on the rollers 39—40 and 47—48. The scraping contact of the toe 106 with this knurled surface thus will in time wear the latter so that it may be necessary to reknurl the roller and then to adjust it in the machine.

Also forming part of the paste applying elements of the machine is a paste feed paddle 121 rotatably mounted immediately to the rear of the rollers 48—105 and on an axis slightly above that of roller 48. An agitating paddle 122 is also provided and is located above the path of the paddle 121 and slightly to the rear thereof in order to continuously agitate as well as to feed the paste down into the path of paddle 121. The aforesaid bottom 81 of the hopper 77 is hinged at its upper rear edge by means of a shaft 123 journaled between the sides 37 and the bearing 124 formed on said bottom for reception of this shaft substantially meets a wear rail 125 held by cap screws 126 to the lower extremity of the rear hopper wall 78 so as to prevent the escape of paste at this point. The bottom 81 is also provided with front and rear arcuate portions 127 and 128 which closely follow the contour of the lower portion of roller 48 and of the path of the paddle 121 respectively, and at its forward edge of the bottom substantially meets the adjacent face of the troweling bar 50 so that in conjunction with the various rollers the walls 78—80 and bottom 81 the rear, front and bottom of the paste hopper 77 is closed. It is, however, necessary to periodically clean out the paste hopper and this is the purpose in my machine of hinging the bottom 81 by means of the shaft 123 so that the bottom may be swung to the open position designated by the dotted lines in Fig. 7. Normally, however, the hopper bottom is held upwardly to the closed, full line position by means of a cross rod 129 slidably extending through the sides 37 of the paste feed unit 16 and engaging a suitable rib 130 on the underside of the bottom of the hopper. When it is desired to open the hopped for cleaning, the cross rod 129 is pulled out from one side of the machine permitting the bottom 81 to drop and for this purpose one end of the rod 129 is provided with a cross pin 131, seen in Fig. 1, by which it may be readily grasped and pulled out and then replaced after the cleaning operation is completed.

During the operation of the machine the roller 47 will discharge excess paste from the space 63 and some provisions must be made for the return of this accumulation of excess to the paste hopper 77. In my present machine the unit 11 has a bottom 132 formed along its rear edge with a depression of U-shaped cross section which constitutes an accumulating tray 133 located immediately below said roller 47. At one side of the machine, designated at 134 in Fig. 1, there is an opening into said tray 133 so that a spatula-like implement (not shown) may be periodically inserted into this opening in order to pick up the accumulated excess of paste and return it to the hopper. Furthermore, the grid panels, as they reach the pasting stage of the over-all manufacturing procedure, may carry a dusty film caused by the sizing operation and as the panels are moved into place by the disks 32 this dust will have a tendency to fall downward upon the roller 47, which will in turn roll the dust into the paste being applied to the panels. The amount of dust which thus falls is very minute but to insure that all of it is directed by roller 47 into the paste on the panel there is provided a shield plate 135 (Fig. 7) secured to a false bottom 135a forming part of unit 11 and extending angularly downwardly and rearwardly from beneath the disks 32 toward the upper peripheral portion of the roller 47.

Figure 3:
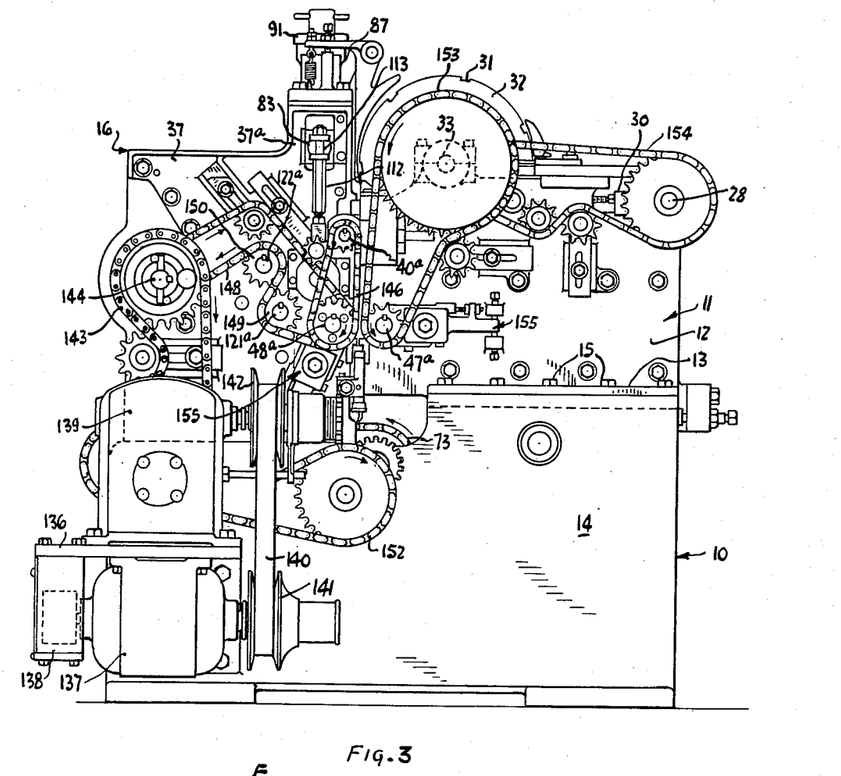
Fig. 3 is a side elevation of the left-hand side of the machine or the side opposite to that from which it is viewed in Fig. 1.

Obviously the drive mechanism for the various rotating parts of the machine has but little bearing on the real inventive concept here involved, but it will be noted in Fig. 3 that a bracket 136 is secured to the side of the base 10 from which bracket there is suspended an electric motor 137 operating against a conventional magnetic brake 138. Torque from the motor 137 is transmitted to a gear speed reducer unit 139 mounted atop the bracket 136 by means of a drive belt 140 and conventional, variable speed pulleys 141–142 secured respectively to the motor shaft and the drive shaft of the unit 139. Power from unit 139 is then employed by means of a sprocket chain 143 to drive a main countershaft 144 extending crosswise through the paste feed unit 16 at the rear of paste hopper 77. The various rollers 39–40, 47–48, 105 and the paddles 121 and 122 are all provided with laterally projecting stub shafts engaged in suitable bearings upon the opposite sides of the machine. Since the rollers 39–40 rotate in opposite directions their stub shafts 39a and 40a (appearing in Fig. 1) carry meshing gears 145, while at the opposite side of the machine one of said stub shafts 40a carries a sprocket driven by a sprocket chain 146. The rollers 47—48 likewise have laterally projecting stub shafts 47a and 48a respectively and the sprocket chain 146 operates over a sprocket secured to the stub shaft 47a at this particular side of the machine, whereas at the opposite side these stub shafts 47a—48a carry meshing gears 147, as seen in Fig. 1, to cause the rollers to travel in the proper opposite directions. It will be noted, however, in Fig. 1 that the gears 147 differ in diameter so that the roller 47 will rotate at a slower speed than roller 48 for a purpose presently to appear. At the side of the machine opposite these gears 147 a sprocket chain 148 operates over a sprocket on the stub shaft 48a to drive the two rollers 47—48 and also operates sprockets 149 and 150 of the stub shafts 121a and 122a of the paddles 121—122 in such fashion as to rotate these paddles in opposite directions as indicated by the arrows in Fig. 7. On the opposite side of the machine the stub shaft 122a of the upper or agitating paddle 122 there is a sprocket which is connected by a sprocket chain 151 operating over the aforesaid stub shaft 107 in order to drive the paste feed roller 105 in the proper direction and at the proper relative rate of rotation. Returning again to the opposite side of the machine, as seen in Fig. 3, the carry-away conveyor chains 72 are driven by a sprocket chain 152 operated by the speed reducer unit 139, whereas the disks 32 are operated by a sprocket chain 153 driven off the stub shaft 47a and the feed conveyor chains 27 are driven by another sprocket chain 154 operating a sprocket upon the aforesaid shaft 28. As shown in both Figs. 1 and 3 there are various idler sprockets suitably and adjustably mounted in order to maintain the drive chains in the properly taut condition, but it is not regarded as necessary to refer to all of these elements in detail since they are wholly conventional. It is, however, important to note that the stub shafts 47a and 48a for the rollers 47—48 are adjustably mounted through openings 47b—48b in the walls 12 and 37 respectively (Fig. 8) so that the distance between the most closely adjacent portions of the surfaces of these rollers may be readily and accurately adjusted. The adjustable mounting for the bearings in which these stub shafts are carried is designated generally at 155 throughout and they too are conventional in their arrangement.

In operation of the machine the two units 11—16 are, of course, located in proper juxtaposition and with the motor 137 in operation the grid panels A are moved by the chains 27 toward the disks 32 by which the panels are carried over one at a time and projected edgewise down into the throat 34. As the panels move down through this throat 34 they are engaged in succession by the rollers 39—40 so that the panels continue downwardly one at a time through the pasting zone 60, whereat they are pasted and from which they drop upon the carry-away conveyor chain 72 ready for further operations. A supply of the pasty, active material is carried in the paste hopper 77 to a level at least sufficient to immerse the rotating components in the bottom of the hopper and the paddles 121—122 cooperate to urge the paste continually toward the throat 156 formed at the rear of and between the two rollers 48—105. These rollers act with what may be described as a wringer effect upon the paste to urge the paste continually toward the pasting zone 60 and to continually maintain a working quantity of paste in that zone. It is to be noted, however, that the rate at which paste is supplied to the pasting zone is regulated by the spacing at 157 (Figs. 7 and 8) between the closest peripheral surfaces of the rollers 48—105 and that from this point forward toward the pasting zone 60 the space through which the paste travels, designated at 158, and which space exists between the roller 48 and the lower surface 159 of the shoe 101 and between the roller and the cut-away portions 55 of the guide bar 46, gradually increases so that it offers no impediment to the smooth feeding of paste toward the pasting zone. The roller spacing 157 determining the rate at which paste is supplied to the zone, or determining the thickness of the film or layer of paste so supplied, may be accurately adjusted as heretofore described by manipulation of the knob 91 to raise or lower the hopper forward wall 80 and its attached shoe 101 and roller 105. It will also become apparent at this point why it is necessary for the roller 105 to be independently adjustable to precisely parallel roller 48 since unless these rollers are parallel then obviously one side of the panel will be supplied with a greater amount of paste than the other. As the grid panels move downwardly through the pasting zone 60 the roller 48 will roll paste into the interstices in the network areas of the two grids of the panel, forcing the paste through the spaces between the wires and grids, and the roller 47 acts in a backup capacity to prevent the escape of the paste and cooperate in rolling the paste from both sides into all areas of the panels. Then as the panels move downwardly between the troweling bars 49—50 the troweling surfaces 52 thereof will trowel the paste applied to the panels smoothly upon the opposite sides, compacting it into the interstices and insuring that the complete filling of the panels occurs. The beveled upper edges 65—66 of the troweling bars are important in that any excess of paste on either side of the panel will be ironed out without jamming and will remain in the pasting zone 60, this being particularly important since in the present machine the two rollers 47—48 are so spaced apart that their peripheral surfaces do not themselves contact the grid panels. It is also important to note that these beveled edges 65—66 are located in the same horizontal plane as the axis of rotation of the rollers 47—48 so that the troweling action is initiated just as the moving peripheral surfaces of the rollers begin to recede away from the opposite sides of the grid panels.

Due to the wringer-like action of the rollers 48—105 upon the paste as it is forced toward the pasting zone 60 any lumps in the paste are crushed so that they will not jam the machine, but should a foreign object of any nature move between these rollers, then the resistance of the spring 93 will be overcome permitting the roller 105 and shoe 101 to move upwardly so that damage will not occur. I contemplate the provision of a safety switch for shutting off the motor 137 should such upward movement of the shoe and the roller occur, but since safety devices of this nature are so well known in various arts the switch is not disclosed herein.

The spacing 157 between rollers 48—105 is so adjusted that a slight excess of paste is continuously supplied to the pasting zone 60 and this excess, while very small by comparison with the amount of paste actually applied to the panels, must of course be disposed of in some way. The roller 48 will return a part of this excess through space 64 to the hopper for re-entry into the pasting zone while roller 47 will discharge its portion of the excess through space 63 into the aforesaid tray 133 wherein it is accumulated for periodic return to the paste hopper 77. These gradually increasing spaces between the beveled surfaces 61—62 and adjacent peripheral surfaces of the rolls 47—48 facilitates this carrying away of excess paste. It is also desirable to slightly over-paste the panels, that is to provide them with a paste layer a few thousandths thicker than that of the panels themselves, for which purpose the troweling surfaces 52 are set apart at the proper spacing. The continuous supply of a slight excess of paste to the pasting zone 60, plus the fact that the troweling surfaces 52 are set apart these few thousandths necessary for proper over-pasting, results in the building up of a back pressure on the panels between the roller 47 and adjacent surfaces of the panels, tending to urge the latter toward roller 48. It is for this reason that I contemplate operating the roller 47 at a higher rate of rotation than roller 48 so that this back pressure will be diminished, to equalize the pressure at each side of the panel, to an extent such that it will cause no problem and so that the excess of paste on the side of the panel opposite roller 48 will be carried away to better advantage.

As heretofore described the guide bar 46 is provided with downward blanking portions or extensions 59 at its opposite ends and center in order to blank out the border portions of the grid panels A at the pasting zone and insure that the paste is applied only through the openings 57 and 58 over the reticulated areas of the panels. When panels of a different dimension are being pasted the guide bar 46 may be readily replaced by removing the screws 160, seen in Fig. 4, by which the bar is held to the forward face of the paste feed unit 16 and a bar substituted having extensions of different size according to the dimensions of the panels to be pasted.

Also as stated heretofore it is periodically necessary to clean out the paste hopper 77 for which purpose the units 11—16 are spaced apart by manipulation of hand lever 17 and the bottom 81 of the hopper is swung downwardly to expose the pasting components in the lower part of the hopper. While this hinged arrangement of the hopper bottom 81 is a practical one, and one which permits ready access to the hopper bottom for cleaning without the use of any tools, I do not, of course, limit myself thereto and the hopper may be provided with a bottom bolted in place or otherwise mounted as may appear to be expedient.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. For pasting storage battery grid panels of the type having reticulated areas, a pasting machine comprising in combination, means having spaced apart surfaces defining a grid panel passageway having a pasting zone, means for moving the panel through the passageway, a paste supply source, means for causing paste to move in a layer from the source to the pasting zone and to be applied as a layer to the panel in the passageway, said means including a paste applying roller and a shoe member having an arcuate surface spaced from the roller, means receiving paste from the source and for spreading it upon the roller, means including said arcuate surface for confining the layer upon the roller while said layer is being moved to the pasting zone, means for adjusting the thickness of said layer so as to provide a slight surplus of paste, a back-up roller on the side of the passageway opposite to the paste-applying roller for engaging the paste pushed through the reticulated areas of the panel, said back-up roller removing the surplus of paste pushed through the panel, and spaced troweling elements located in the path of the panel as it leaves the pasting zone and operative to engage the pasted panel from opposite sides and thereby determine the thickness of the paste applied to the panel, the paste applying and back-up rollers being spaced apart at their adjacent surfaces a distance greater than the spaced apart surfaces defining said grid panel passageway.

2. A pasting machine for storage battery grid panels which have reticulated areas, comprising in combination, means having spaced apart surfaces forming a grid panel passageway having a pasting zone, means for moving the panel through the passageway, a paste supply hopper, means for causing paste to move in a layer from the hopper to the pasting zone and to be applied as a layer to the panel in the passageway, said means comprising a paste applying roller and a shoe member having an arcuate surface spaced from the roller, a paste feed roller receiving paste from the hopper for spreading the paste upon the paste applying roller, means including said arcuate surface for confining the layer upon the paste applying roller while said layer is moved to the pasting zone, means for adjusting the distance between the paste applying roller and paste feed roller to control the thickness of said layer so as to provide a continual slight surplus of paste in the pasting zone, a back-up roller on the side of the passageway opposite to the paste-applying roller for engaging the paste pushed through the reticulated areas of the panel, said back-up roller removing the surplus of paste pushed through the panel, the paste applying and back-up rollers being spaced apart at their adjacent peripheries a distance greater than the distance between said surfaces forming said grid panel passageway, and spaced apart means engaging the opposite sides of the panel as it leaves the pasting zone with a troweling effect on the paste and determining the thickness of paste applied to the panel.

3. A pasting machine for storage battery grid panels which have reticulated areas, comprising in combination, means having spaced surfaces defining a grid panel passageway having a pasting zone, means for moving the panel through the passageway, a paste supply hopper, means for causing paste to move in a layer from the hopper to the pasting zone and to be applied as a layer to the reticulated areas of the panel in the passageway, said means comprising a paste applying roller and a shoe member having an arcuate surface spaced from the roller, a paste feed roller receiving paste from the hopper for spreading the paste upon the paste applying roller, means including said arcuate surface for confining the layer upon the paste applying roller while said layer is moved to the pasting zone, means for adjusting the distance between the paste applying roller and paste feed roller to control the thickness of said layer so as to provide a continual slight surplus of paste in the pasting zone, a back-up roller on the side of the passageway opposite to the paste-applying roller for engaging the paste pushed through the reticulated areas of the panel, said back-up roller removing the surplus of paste pushed through the panel, spaced apart troweling bars engaging the opposite sides of the panel as it leaves the pasting zone with a troweling effect on the paste and determining the thickness of paste applied to the panel, the paste applying and back-up rollers being spaced apart at their adjacent peripheral surfaces a distance greater than the spacing between said surfaces which define the grid panel passageway, and said troweling bars having flared apart beveled edge portions substantially coextensive with the width of the reticulated areas of the panel and receiving the panels as they leave the pasting zone.

4. A machine for applying a layer of paste to storage battery grid panels, comprising a grid panel passageway having a pasting zone, means for moving the panels through the passageway, a paste supply hopper, means for moving paste in a wide layer from the hopper to the pasting zone, said means comprising a paste applying roller and a back-up roller located on opposite sides of the passageway at said pasting zone, means receiving paste from the hopper and for spreading it upon the paste applying roller, means for adjusting the amount of paste spread on the paste applying roller so as to provide a slight surplus, said back-up roller removing the surplus of paste pushed through the panel, and means for rotating the paste applying roller and back-up roller in opposite directions and at relatively different speeds with the back-up roller moving faster than the paste applying roller.

5. A pasting machine for storage battery grid panels which have reticulated areas, comprising in combination, a grid panel passageway having a pasting zone, means for moving the panel through the passageway, a paste supply hopper, means for causing paste to move in a layer from the hopper to the pasting zone and to be applied as a layer to the panel in the passageway, said means comprising a paste applying roller and a shoe member having an arcuate surface spaced from the roller, means receiving paste from the hopper and for spreading it upon the roller, means including said arcuate surface for confining the layer upon the roller while said layer is being moved to the pasting zone, means for adjusting the thickness of said layer so as to provide a slight surplus of paste in the pasting zone, a back-up roller on the side of the passageway opposite to the paste-applying roller for engaging the paste pushed through the reticulated areas of the panel, said back-up roller removing the surplus of paste pushed through the panel, and means for rotating the rollers and operative to rotate the back-up roller at a higher rate of rotation than the paste applying roller.

6. In a storage battery grid panel pasting machine having a paste receptacle and a grid panel passageway, a pair of adjacent rollers located upon opposite sides of said passageway and one being located in the paste receptacle, a third roller disposed over the adjacent surface of the roller in said paste receptacle, a plate forming the front wall of the receptacle, means for mounting the plate and said third roller for simultaneous upward movement, said plate having a shoe having an edge in shaving contact with the surface of said third roller, and means adjustably connecting the said third roller to the plate for adjusting that roller independently of the plate and shoe with reference to the shoe and to the roller beneath.

7. In a grid panel pasting machine having a paste receptacle and a grid panel passageway, a pair of spaced apart rollers located at opposite sides of said passageway and one being located in the paste receptacle for conveying paste from the receptacle to the passageway, a third roller disposed over the roller in said receptacle, a plate forming the front wall of the receptacle, spring biased means mounting the plate and said third roller for spring resisted simultaneous upward movement, and adjustable tie rods connecting opposite ends of the said third roller to the plate whereby the third roller is adjustable independently of the plate and with reference to the roller in the paste receptacle.

8. A machine for applying paste to storage battery grid panels which have reticulated areas and end and center borders, comprising means defining a passageway for the panels and said means having openings for forming a pasting zone, a paste receptacle communicating with the pasting zone, means including cooperating rollers for rolling paste into the reticulated areas of the panels at the pasting zone, and said means forming the passageway for the panels including a replaceable guide bar having center and end extensions at the pasting zone for blanking out paste from the end and border areas of the panels and thereby exposing only the reticulated areas of the panels to the paste.

9. A machine for applying paste to storage battery grid panels which have reticulated areas and end and center borders, comprising means defining a passageway for the panels and said means having openings for forming a pasting zone, a paste receptacle communicating with the pasting zone, means including cooperating rollers for rolling paste into the reticulated areas of the panels at the pasting zone, said means forming the passageway for the panels including a replaceable guide bar having center and end extensions at the pasting zone for blanking out paste from the end and border areas of the panels and thereby exposing only the reticulated areas of the panels to the paste, and troweling bars for engaging opposite sides of the panels as they leave the pasting zone, the troweling bar nearest said guide bar having an edge tightly fitting the extremities of the said center and end extensions of that bar.

10. A grid panel pasting machine comprising, in combination, a panel passageway having a pasting zone, means for moving panels through the passageway and said pasting zone, a paste hopper, a paste applying roller on one side of said pasting zone for carrying a layer of paste supplied from the hopper to the pasting zone of the passageway and for forcing the paste layer into the panels, a stationary shoe member having an arcuate surface spaced from the paste applying roller and cooperating therewith to provide a paste receiving space means for forcing paste from the hopper into said space and including a paste feed roller and two paddles located in the paste hopper and cooperating to move paste into said space, a back-up roller located adjacent the said paste applying roller but on the opposite side of said pasting zone, and a bottom closure for said paste hopper separate from the rollers and paddles therein and movable to a position exposing the bottom of the hopper for cleaning purposes, the said bottom closure for the hopper being hinged to the paste hopper, and releasable means for holding the closure in hopper closing position.

11. A pasting machine for storage battery grid panels which have spaced apart reticulated areas defined in part by substantially imperforate center and end borders, comprising means defining a passageway for the panels and having a pasting zone, a paste receptacle communicating with the pasting zone, means including cooperating paste applying and back-up rollers on opposite sides of said passageway at the pasting zone for rolling paste into the reticulated areas of the panels, the said rollers being spaced apart at their contiguous surfaces a distance greater than the thickness of the panels and the width of said passageway, said means defining the passageway including replaceable guide bars having spaced apart openings at the pasting zone coextensive with the width of the reticulated areas of the panels and defined by center and end extensions of the bars which coincide with the center and end borders of the panels and which terminate between the rollers in the plane of the axes of the said rollers, troweling bars extending in an opposite direction between the rollers and meeting the center and end extensions of the guide bars, and means for moving panels through the pasting zone.

12. A pasting machine for storage battery grid panels which have spaced apart reticulated areas defined in part by substantially imperforate center and end borders, comprising means defining a passageway for the panels and having a pasting zone, a paste receptacle communicating with the pasting zone, means including cooperating paste applying and back-up rollers on opposite sides of said passageway at the pasting zone for rolling paste into the reticulated areas of the panels, the said rollers being spaced apart at their contiguous surfaces a distance greater than the thickness of the panels and the width of said passageway, said means defining the passageway including replaceable guide bars having spaced apart openings at the pasting zone coextensive with the width of the reticulated areas of the panels and defined by center and end extensions of the bars which coincide with the center and end borders of the panels and which terminate between the rollers in the plane of the axes of the said rollers, troweling bars extending between the rollers toward and having edges meeting the ends of the said center and end extensions of the guide bars, these edges between the points where they meet the said extensions of the guide bars being oppositely beveled to provide flaring throats to receive the panels leaving the pasting zone, and means for moving the panels through the pasting zone.

13. In a pasting machine for storage battery grid panels of the type wherein the paste is applied initially to one side of a grid panel, a grid panel passageway having a pasting zone, and a paste supply hopper, means for equalizing pressure on each side of the grid panel during the pasting operation comprising a paste applying roller for moving paste from said hopper to said pasting zone, a back-up roller, and means for rotating said back-up roller at a relatively slower speed than said paste applying roller.

14. A machine for applying paste to storage battery grid panels which have reticulated areas and non-reticulated border portions, comprising means forming a passageway for edgewise movement of the panels therethrough including a pair of guide bars defining a first portion of said passageway, a pair of troweling bars defining a second portion of said passageway, a paste applying roller disposed at one side of the passageway, and a back-up roller parallel with the paste applying roller and disposed at the opposite side of the passageway therefrom, said guide bars having spaced portions defining intervening openings, said spaced portions meeting the adjacent edges of the respective troweling bars along a line coincident with the plane passing through the axes of the two rollers, said spaced portions of the guide bars being positioned so as to cover border portions of the panels as they pass thereby, and the aforesaid intervening openings between such guide bar portions providing zones for the application of paste to the reticulated areas of the panels as they pass between the rollers and into engagement with the troweling bars.

15. The structure defined in claim 14, in which the spacing between the rollers is greater than the spacing between the troweling surfaces of the troweling bars whereby the paste applying roller may supply a layer of paste to the reticulated areas of the grid panels as they pass through said zones of greater thickness than will be permitted to pass between the troweling bars.

References Cited in the file of this patent

UNITED STATES PATENTS

| | | |
|---|---|---|
| 1,426,671 | Printz | Aug. 22, 1922 |
| 2,107,733 | Henry | Feb. 8, 1938 |
| 2,353,445 | Crafts | July 11, 1944 |
| 2,375,424 | Lund | May 8, 1945 |